United States Patent [19]

Ehrenhalt

[11] Patent Number: 4,712,766
[45] Date of Patent: Dec. 15, 1987

[54] EASY SQUEEZE NOZZLE HOLDER

[75] Inventor: Caradoc Ehrenhalt, Los Angeles, Calif.

[73] Assignee: Easy Use Products, Inc., Los Angeles, Calif.

[21] Appl. No.: 28,735

[22] Filed: Mar. 23, 1987

[51] Int. Cl.⁴ .......................... G05G 5/06; F16K 31/00
[52] U.S. Cl. ...................................... 251/90; 24/16 R; 24/16 PB; 141/392; 224/901
[58] Field of Search .............. 24/16 R, 16 PB, 30.5 P, 24/265 WS, 450; 74/525, 526; 128/DIG. 26; 141/1, 392; 224/901; 248/205.2; 251/90, 111

[56] References Cited

U.S. PATENT DOCUMENTS

| | | | |
|---|---|---|---|
| 4,088,136 | 5/1978 | Hasslinger et al. | 24/16 R |
| 4,096,863 | 6/1978 | Kaplan | 24/16 R |
| 4,201,253 | 5/1980 | Maloney | 251/90 |
| 4,220,302 | 9/1980 | Hampton et al. | 24/306 |
| 4,337,917 | 7/1982 | Tesack et al. | 251/90 |
| 4,445,894 | 5/1984 | Kovacs | 128/DIG. 26 |
| 4,569,348 | 2/1986 | Hasslinger | 24/16 R |
| 4,617,017 | 10/1986 | Hubbard et al. | 128/DIG. 26 |

*Primary Examiner*—George L. Walton
*Attorney, Agent, or Firm*—John E. Wagner

[57] ABSTRACT

A holding device intended to engage a single finger of the hand and provide an encircling strap with the universal length fastening capability to aid a person in holding a mechanical device without extended strain on the user's hand. The device is particularly intended to aid a self service gasoline customer in holding the gasoline nozzle valve handle in an open position for the period of time necessary to fill the user's automobile fuel tank. The device is generally cross shaped with hook and pile fastener material on opposite sides of the end regions of both the cross bar and the vertical bar of the cross shaped member which itself is fabricated of a flexible material such as web strapping in the order of three quarters of an inch in width. Nominal dimensions are eight inches by two and one half inches. The cross arm portion of the device is of sufficient length to encircle a finger such as the index finger and be secured around the user's finger to hold the strap in place. The length of the member is sufficient to encircle within the user's grip, the device to be held or actuated, including sufficient overhang for the hook and pile fabric to engage and hold the mechanical device, e.g. fuel nozzle valve handle.

6 Claims, 9 Drawing Figures

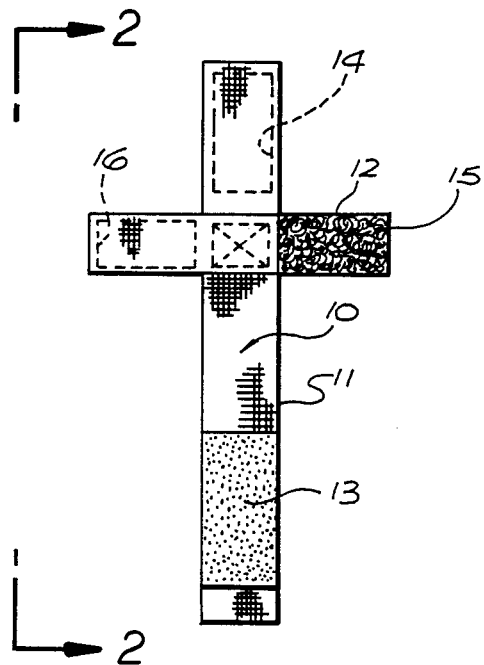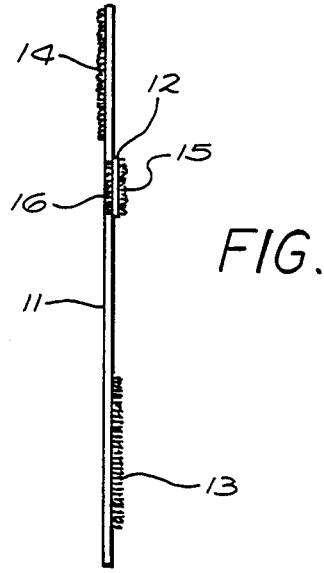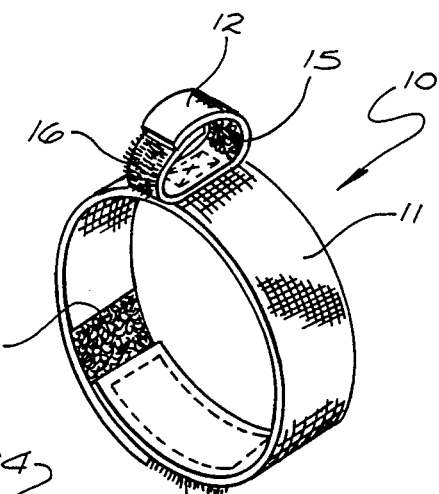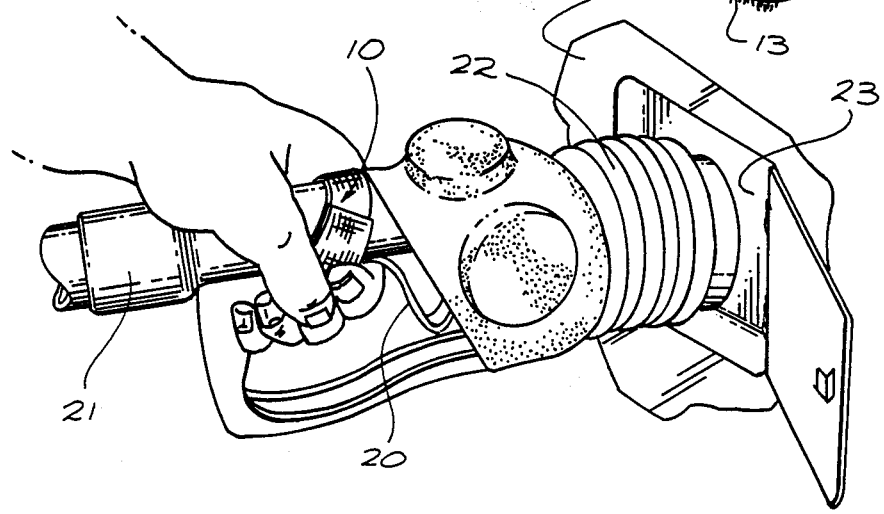

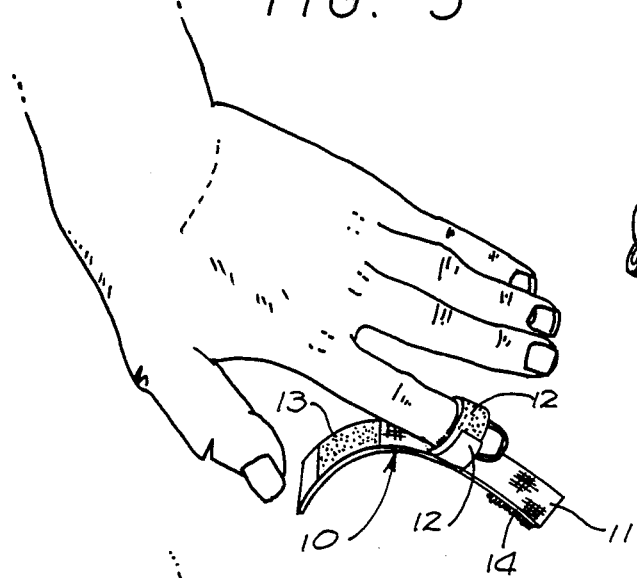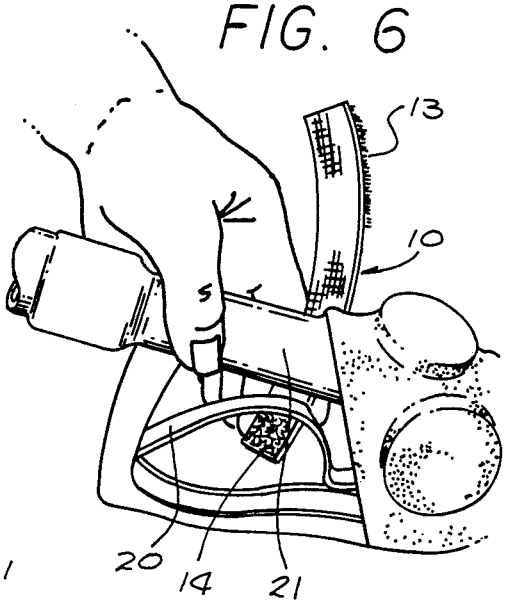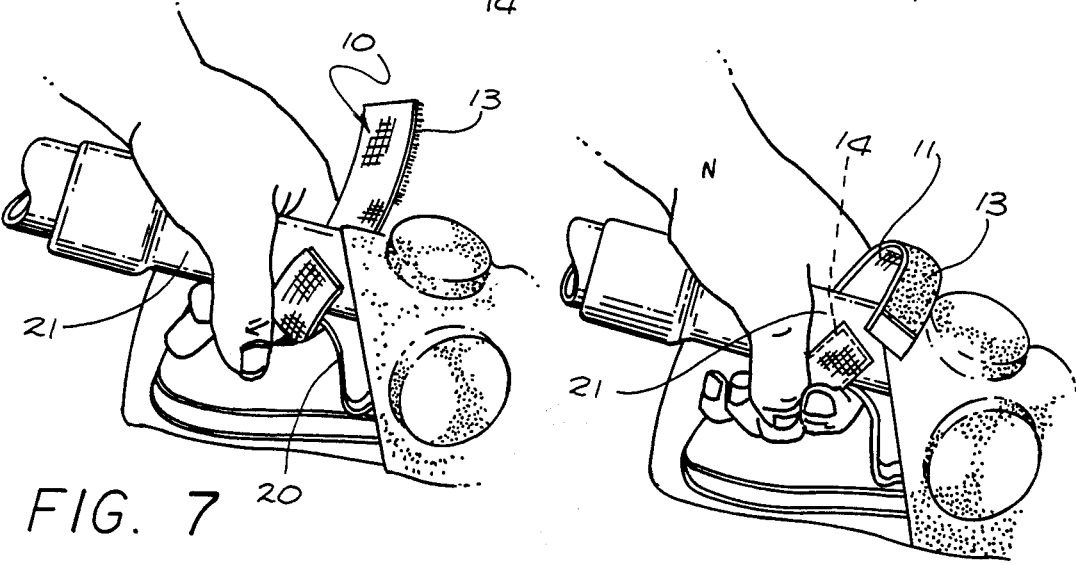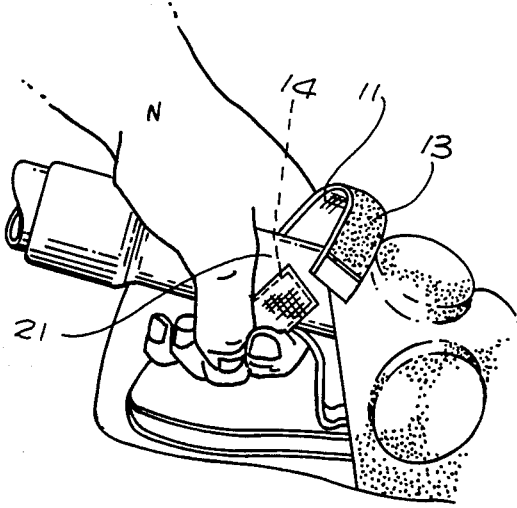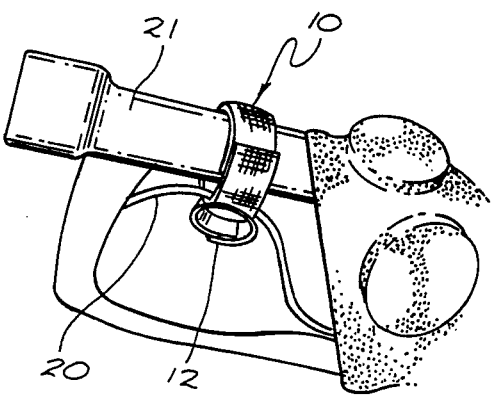

EASY SQUEEZE NOZZLE HOLDER

BACKGROUND OF THE INVENTION

The day of the self-service fuel filling station is upon the world economy. With automotive fuel cost becoming a major expense for the typical auto owning household, the opportunity for saving in cost by filling one's own fuel tank becomes attractive. It is no longer the teenager who is seen standing beside their automobile, fuel nozzle in hand servicing their own auto. Now one sees the business man, his wife or even his daughter pumping their own fuel.

Recently, ecologically sensitive states have enacted legislation requiring that fuel nozzles include vapor recovery systems resulting in dual hoses on even larger nozzles. The net result is that self service filling stations or pumps have large cumbersome nozzles which themselves tax the strength of patrons of slight build such as females. Add to the weight of the nozzle, the need to compress and hold the flow control handle, the self service filling of ones own fuel tank can become a chore.

BRIEF DESCRIPTION OF THE INVENTION

Faced with this very real problem, I have devised a simple inexpensive, yet effective, device to aid one in holding the fuel nozzle handle in an ON position while filling one's fuel tank. It comprises a flexible fabric strip in the shape of a cross with means for forming the cross arm into finger sized loop and means for forming the body of the cross into a larger loop of size comparable to the human adult's maximum practical grasp, e.g. approximately 2 inches in diameter, and, in any event, of sufficient size to hold a fuel nozzle handle in the operated condition. The adjustablity of the smaller loop allows the device to adjust to various size of fingers of young female drivers to larger masculine hands. The larger loop is adjustable to match different styles of nozzles and to allow different flow rates to be controlled by the user. The loops are formed and adjusted in size through the use of hook and pile fabric fastener type material secured to the fabric base. Other type of fasteners may be used, however, hook and pile fabric fastener material sold under the trademark Velcro has been found to be most effective.

BRIEF DESCRIPTION OF THE DRAWINGS

This invention may be more clearly understood from the following detailed description and by reference to the drawing in which:

FIG. 1, is a front elevational view of the holding device of this invention;

FIG. 2, is a side elevational view thereof;

FIG. 3, is a perspective view of the holding device of this application in its normal form when in use;

FIG. 4, is a perspective view of this invention in use;

FIGS. 5-9, are a series of sequence diagrams showing this invention in its various stages of use.

DETAILED DESCRIPTION OF INVENTION

Now referring to FIGS. 1 and 2, the simplest form of this invention is illustrated as a cross shaped fabric member 10, having a body 11 and a cross member 12, all fabricated from material such as one inch webbing. The body member 11 includes on its front face a section of one part of hook and pile fabric, preferably the hook fabric 13, sewn or otherwise secured to the strap near the bottom of the body portion 11. On the rear face of the body 11 is the mating hook and pile fabric toward the top indicated by the dash stitch lines 14. The body 11 preferably has a length in the order of six to eight inches. The cross bar 12, likewise of fabric includes one part of a two part hook and pile fastener 15 on the adjacent side and its mating part 16 on the rear face of the other arm. As so arranged, the device is able to form two loops, each of adjustable size and at generally 90 degree angles with respect to each other. The smaller of the two defined by the cross arm 12 is of dimension to encircle an index finger in order that the strap can be carried by the user. The loop formed by the body of the cross member is larger, the dimension of which can vary from approximately two and one half inches to a minimum diameter of one inch. In its normal usage, it assumes a diameter of approximately two inches, which is comparable to the normal adult human maximum practical grip. This relative size relationship is apparent in FIG. 3.

In the preferred embodiment of FIGS. 1 and 2, the following materials and dimensions were used:

| body 10 | polyesther webb strapping 1" × 7" (2.5 cm × 18.5 cm) |
|---|---|
| cross arm 12 | Velcro brand, hook and pile fabric ¾" × 3¾" (1.8 cm × 9.6 cm) |
| hook 13 | Velcro brand, hook fabric 1" × 2" (2.5 cm × 5 cm) |
| pile 14 | Velcro brand pile 1" × 1½" (2.5 cm × 3.8 cm) |

The most useful application of this invention is in self service filling stations in which the user must hold the handle 20 of a fuel supply nozzle 21 in order that fuel is delivered to the vehicle 24 via its fuel delivery tube, unshown in the drawing but surrounded by vapor recovery collar 22 within the fuel filler opening denoted generally by fuel filler recess 23.

The filling of a fuel tank by the user requires a substantial hand pressure as shown in FIG. 4, for a few minutes depending on the fuel rate of fill. With recent advances in the field of vapor recovery including vapor collars that resist insertion of the fuel nozzle in the fuel filler tube and the need to hold the nozzle precisely in the filler tube of the vehicle in addition to the finger pressure to hold the valve open, many individuals, especially those of slight build may have difficulty filling their gas tanks. This can result in losing control of the nozzle and possible fuel spillage. This invention relieves the pressure on the hand of holding the valve handle 20 open. Fuel filler nozzles of the type involved include an automatic shut off so that the holding of the handle in its ON position by this invention does not increase the likelihood of fuel spillage. In fact the ideal use of this invention results in a termination of flow as soon as the automatic fuel cut off stops the fuel for the first time. One need only to release the holder at that time without attempting to top off the fuel tank, which is the major cause of fuel spillage. The holding device of this invention may be stored easily in a glove compartment.

Now referring to FIGS. 5-9, for an understanding of a sequence of use.

The holding device of this invention 10 is laid out in its cross shape and the user's hand laid on top with the index finger aligned with the body of the cross 11. The arm 12, is folded over the index finger and the hook and pile fabric engaged to form a snug loop around the user's index finger. Next the user grasps the nozzle handle body portion 21 and reaches around the handle 20 in its normal manner as is illustrated in FIG. 6.

The user next commences the delivery of fuel by lifting the handle 20 to full upright or to the level of fuel delivery he desires. The inherent stiffness of the strapped hand allows it to particularly curl around the body of the nozzle and with thumb action by the user, bring the hook and pile fabric into engagement around the body of the nozzle. FIG. 8 shows this step just prior to engagement of the body 11 parts by the hook and pile fabric sections 13 and 14.

FIG. 9, shows this invention in its location on the nozzle 21, holding the handle 20 in the actuated position without the user's hand in place. This figure is for illustration purposes only, as it is not recommended that the hand be removed during fuel filling, but that the holder 10 merely relieves the holding pressure from the user's fingers.

In other applications of this invention such as watering nozzles where the normal latch for holding the water nozzle open may have failed, this device may be used for full flow of water without interference.

The foregoing constitutes the best mode known to me for carrying out my invention and yet the embodiment shown is merely meant to be illustrative of the principle of the invention and is not meant to be limiting in its design. Rather, this invention is to be defined by the following claims including their equivalents.

What is claimed is:

1. A device for holding a mechanical structure such as the operating handle of a fuel delivery nozzle, comprising: an elongated flexible body of material;
   a flexible cross member secured thereto;
   mating adjustable securing means on opposite portions of both said body and said cross member whereby the cross member may be formed into one loop and said body formed into a second loop, each of said loops of adjustable size;
   the cross member dimensioned to form a finger sized loop wherein an index finger is positioned, overlying the flexible body of material and a loop being formed and secured about the index finger; and wherein the flexibility of the body of material allows the body to be naturally formed into a loop around the handle of a fuel delivery nozzle by grasping the handle, thereby bringing the adjustable securing means on said body into mating engagement for holding the handle in an operated position.

2. The combination in accordance with claim 1, wherein said flexible material is fabric.

3. The combination in accordance with claim 1, wherein said adjustable securing means comprises a hook and a pile fabric portion, each on opposite sides of both said body and said cross member.

4. The combination in accordance with claim 1, wherein said body is dimensioned to produce a loop comparable in size to the human grasp.

5. The combination in accordance with claim 1, wherein said body is between six and eight inches long.

6. The combination in accordance with claim 1, wherein the cross member is between two and four inches long.

* * * * *